(12) United States Patent
Masunaga et al.

(10) Patent No.: US 10,634,244 B2
(45) Date of Patent: Apr. 28, 2020

(54) CONTROL DEVICE FOR VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Seiji Masunaga, Nisshin (JP); Ayumu Sagawa, Toyota (JP); Keisuke Ota, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 501 days.

(21) Appl. No.: 15/654,783

(22) Filed: Jul. 20, 2017

(65) Prior Publication Data

US 2018/0031121 A1    Feb. 1, 2018

(30) Foreign Application Priority Data

Jul. 27, 2016  (JP) .................................. 2016-147896

(51) Int. Cl.
```
F16H 61/02      (2006.01)
F16H 61/686     (2006.01)
B60W 10/115     (2012.01)
F16H 59/20      (2006.01)
F16H 59/18      (2006.01)
F16H 61/04      (2006.01)
F16H 61/06      (2006.01)
```

(52) U.S. Cl.
CPC ....... *F16H 61/0213* (2013.01); *B60W 10/115* (2013.01); *F16H 59/20* (2013.01); *F16H 61/061* (2013.01); *F16H 61/686* (2013.01); *B60W 2710/1005* (2013.01); *B60W 2710/1011* (2013.01); *F16H 2059/186* (2013.01); *F16H 2061/0477* (2013.01)

(58) Field of Classification Search
CPC .............. F16H 2059/186; F16H 59/20; F16H 61/0204; F16H 61/0213; F16H 2061/0425; F16H 2061/0429; F16H 2061/0466; F16H 2061/0477; F16H 2061/0496; F16H 61/061; F16H 61/684; F16H 61/686; B60W 10/11; B60W 10/115; B60W 2710/10; B60W 2710/1005; B60W 2710/1011
See application file for complete search history.

(56) References Cited

U.S. PATENT DOCUMENTS

| 2004/0102288 | A1* | 5/2004 | Ayabe ................... | B60W 10/06 477/117 |
| 2007/0129214 | A1* | 6/2007 | Kondo ................ | F16H 61/0437 477/144 |
| 2010/0292048 | A1* | 11/2010 | Oshima ................. | B60W 10/06 477/109 |
| 2017/0341651 | A1* | 11/2017 | Monajemi ........... | F16H 61/0204 |

FOREIGN PATENT DOCUMENTS

| JP | 2003-065429 A | 3/2003 |
| JP | 2007263171 A | 10/2007 |

* cited by examiner

*Primary Examiner* — Jacob S. Scott
(74) *Attorney, Agent, or Firm* — Oliff PLC (57) ABSTRACT

A control device for a vehicle includes an electronic control unit configured to increase a disengagement-side instructed pressure such that an input rotation speed decreases when overspeeding of the input shaft occurs during a coast downshift of an automatic transmission. Overspeeding of the input shaft in a disengagement-side element that forms a gear stage before a downshift having a lower gear ratio than that after the downshift is suppressed.

6 Claims, 4 Drawing Sheets

|  | C1 | C2 | C3 | C4 | B1 | B2 |
|---|---|---|---|---|---|---|
| 1st | O |  |  |  |  | O |
| 2nd | O |  |  |  | O |  |
| 3rd | O |  | O |  |  |  |
| 4th | O |  |  | O |  |  |
| 5th | O | O |  |  |  |  |
| 6th |  | O |  | O |  |  |
| 7th |  | O | O |  |  |  |
| 8th |  | O |  |  | O |  |
| Rev |  |  | O |  |  | O |

O: ENGAGEMENT   BLANK: DISENGAGEMENT

FIG. 4

CONTROL DEVICE FOR VEHICLE AND CONTROL METHOD FOR VEHICLE

INCORPORATION BY REFERENCE

The disclosure of Japanese Patent Application No. 2016-147896 filed on Jul. 27, 2016 including the specification, drawings and abstract is incorporated herein by reference in its entirety.

BACKGROUND

1. Technical Field

The disclosure relates to a control device for a vehicle and a control method for the vehicle that includes a stepped transmission in which a plurality of gear stages having different gear ratios are selectively.

2. Description of Related Art

Japanese Patent Application Publication No. 2003-65429 (JP 2003-65429 A) discloses a control device for a vehicle including an engine and a stepped transmission in which a plurality of gear stages having different gear ratios are selectively established by controlling engagement of an engagement-side element of a plurality of engagement elements and disengagement of a disengagement-side element. In JP 2003-65429 A, a gear shift is performed by switching between engagement and disengagement of a plurality of engagement elements and a hydraulic pressure to the engagement elements is controlled such that a turbine rotation speed increases to a predetermined speed during a downshift. In JP 2003-65429 A, the control device calculates the turbine rotation speed when a downshift is completed, detects occurrence of overspeeding of the turbine depending on an increasing state of the turbine rotation speed in a predetermined time from a time point at which outputting of a hydraulic pressure to an engagement-side element starts to a time point at which the turbine rotation speed reaches a turbine rotation speed when the downshift is completed, and sets an increase ratio of a hydraulic pressure which is supplied to the engagement-side element to be greater than the increase ratio in the predetermined time when occurrence of overspeeding of the turbine is detected.

SUMMARY

In the automatic transmission that performs a gear shift by switching between engagement and disengagement of the engagement elements, when overspeeding of the turbine (an input shaft) of the stepped transmission (the input speed of the stepped transmission exceeds a synchronous rotation speed) is suppressed using an engagement-side element that forms a gear stage after the downshift (that is, a low-side gear stage) having a gear ratio higher than that before the downshift, an increase in driving force due to a decrease in the input rotation speed may increase. As a result, drivability may be degraded. This decrease in drivability is likely to be significant when overspeeding of the input shaft occurs during a downshift in a state in which the vehicle decelerates and travels and an accelerator is not operated (during a coast downshift).

The disclosure provides a control device for a vehicle and a control method for a vehicle that can suppress degradation in drivability when overspeeding of the input shaft occurs during a coast downshift of a stepped transmission.

A first aspect of the disclosure provides a control device for a vehicle. The vehicle includes an engine and a stepped transmission. The stepped transmission includes an input shaft and a plurality of engagement elements. The plurality of engagement elements includes an engagement-side element and a disengagement-side element. The stepped transmission is configured such that engagement of the engagement-side element and disengagement of the disengagement-side element are controlled such that a plurality of gear stages having different gear ratios is selectively established. The control device includes an electronic control unit. The electronic control unit is configured to determine whether overspeeding of the input shaft occurs during a coast downshift of the stepped transmission. Overspeeding of the input shaft is a state in which rotation speed of the input shaft is higher than a synchronous rotation speed after a downshift. The electronic control unit is configured to control an engagement-side instructed pressure to be output for controlling a clutch torque of the engagement-side element, and to control a disengagement-side instructed pressure to be output for controlling a clutch torque of the disengagement-side element. The electronic control unit is configured to increase the disengagement-side instructed pressure of the disengagement-side element such that the rotation speed of the input shaft decreases, when the electronic control unit determines that overspeeding of the input shaft occurs during the coast downshift of the stepped transmission.

In the control device, the electronic control unit may be configured to perform upshift control and downshift control on the stepped transmission. The coast downshift may be a downshift in a state in which the vehicle decelerates and travels while an accelerator of the vehicle is not operated.

According to this configuration, when overspeeding of the input shaft occurs during a coast downshift of the stepped transmission, the instructed pressure of the disengagement-side element increases to decrease the rotation speed of the input shaft (hereinafter, also recited as the input rotation speed). Accordingly, overspeeding of the input shaft is suppressed in the disengagement-side element that forms a gear stage before the downshift (that is, a high-side gear stage) which is lower in gear ratio than the gear stage after the downshift. Accordingly, a change in driving force due to a decrease in the input rotation speed is reduced and it is possible to suppress degradation in drivability when overspeeding of the input shaft occurs during a coast downshift of the stepped transmission.

In the control device, the coast downshift of the stepped transmission may be a coast downshift in which the rotation speed of the input shaft during the gear shift becomes equal to or lower than an idle rotation speed of the engine.

According to this configuration, since the coast downshift of the stepped transmission is a coast downshift in which the input rotation speed during the gear shift becomes equal to or lower than an idle rotation speed of the engine, overspeeding of the input shaft may occur during the downshift even in the state in which the vehicle decelerates and travels while an accelerator is not operated. However, when overspeeding of the input shaft occurs, the disengagement-side instructed pressure of the disengagement-side element increases and thus overspeeding of the input shaft is suppressed.

In the control device, when the electronic control unit determines that overspeeding of the input shaft occurs during the coast downshift of the stepped transmission, the electronic control unit may be configured to determine whether the rotation speed of the input shaft has not changed and is sluggish. When the disengagement-side instructed pressure increases to decrease the rotation speed of the input shaft and the electronic control unit determines that the rotation speed of the input shaft is sluggish, the electronic control unit may be configured to perform one of reducing an increase gradient of the disengagement-side instructed pressure and retaining the disengagement-side instructed pressure at a current value.

According to this configuration, in the coast downshift in which the input rotation speed becomes equal to or lower than the idle rotation speed of the engine, overspeeding of the input shaft is maintained to be equal to or lower than the idle rotation speed even when a torque capacity of the disengagement-side element is small. Accordingly, it can be ascertained that the torque capacity of the disengagement-side element does not increase (that is, occurrence of the torque capacity is delayed with respect to the disengagement-side instructed pressure of the disengagement-side element) by determining whether the input rotation speed is sluggish. As a result, when the input rotation speed is sluggish, it is possible to suppress an excessive increase of the instructed pressure of the disengagement-side element when responsiveness of the disengagement-side element decreases, by decreasing the increase gradient of the disengagement-side instructed pressure of the disengagement-side element or maintaining the disengagement-side instructed pressure of the disengagement-side element at the current value.

In the control device, the electronic control unit may be configured to increase the disengagement-side instructed pressure and to increase the engagement-side instructed pressure such that the rotation speed of the input shaft decreases.

According to this configuration, by increasing the disengagement-side instructed pressure and increasing the engagement-side instructed pressure such that the input rotation speed decreases, a decrease of the input rotation speed by the engagement-side element is reduced in comparison with a case in which overspeeding of the input shaft is suppressed by only the engagement-side element forming a low-side gear stage having a high gear ratio.

A second aspect of the disclosure provides a control method for a vehicle. The vehicle includes an engine, a stepped transmission, and an electronic control unit. The stepped transmission includes an input shaft and a plurality of engagement elements. The plurality of engagement elements includes an engagement-side element and a disengagement-side element. The stepped transmission is configured such that engagement of the engagement-side element and disengagement of the disengagement-side element are controlled such that a plurality of gear stages having different gear ratios is selectively established. The control method includes: determining, by the electronic control unit, whether overspeeding of the input shaft occurs during a coast downshift of the stepped transmission, overspeeding of the input shaft being a state in which rotation speed of the input shaft is higher than a synchronous rotation speed after a downshift; controlling, by the electronic control unit, an engagement-side instructed pressure to be output for controlling a clutch torque of the engagement-side element; controlling, by the electronic control unit, a disengagement-side instructed pressure to be output for controlling a clutch torque of the disengagement-side element; and increasing, by the electronic control unit, the disengagement-side instructed pressure of the disengagement-side element such that the rotation speed of the input shaft decreases when the electronic control unit determines that overspeeding of the input shaft occurs during the coast downshift of the stepped transmission.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, embodiments of the disclosure will be described with reference to the accompanying drawings.

Figure 1:
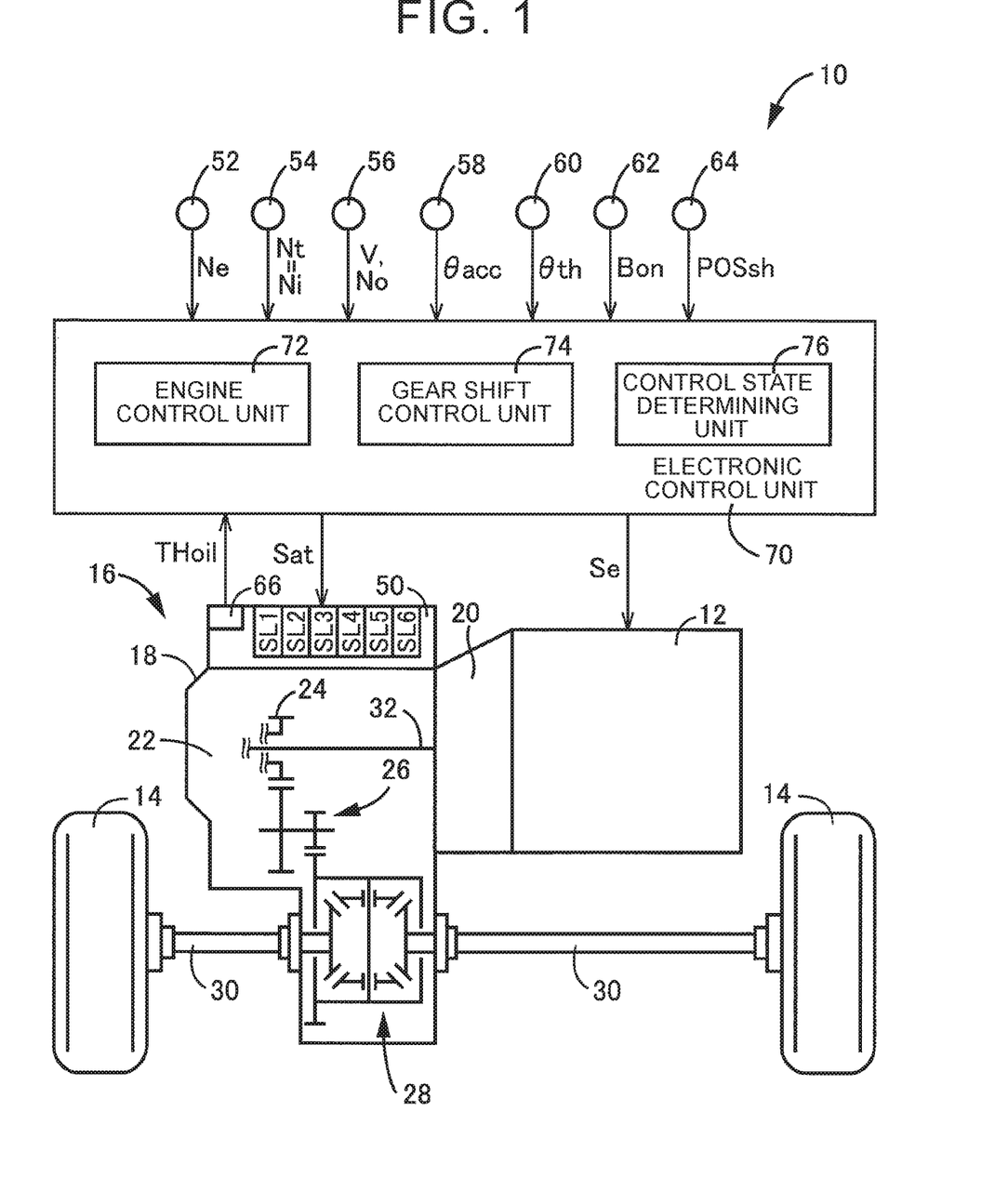
FIG. 1 is a diagram schematically illustrating a configuration of a vehicle according to the disclosure and is a diagram illustrating a control function for a variety of controls in the vehicle and a principal part of a control system.

FIG. 1 is a diagram schematically illustrating a configuration of a vehicle 10 to which the disclosure is applied and is a diagram illustrating a principal part of a control system for a variety of controls in the vehicle 10. In FIG. 1, the vehicle 10 includes an engine 12, driving wheels 14, and a vehicle power transmission unit 16 (hereinafter referred to as a power transmission unit 16) that is disposed in a power transmission path between the engine 12 and the driving wheels 14. The power transmission unit 16 includes a torque converter 20, an automatic transmission 22, a reduction gear mechanism 26 that is connected to a transmission output gear 24 which is an output rotary member of the automatic transmission 22, and a differential gear (a differential gear mechanism) 28 that is connected to the reduction gear mechanism 26, in a case 18 which is a non-rotary member attached to a vehicle body. The power transmission unit 16 includes a pair of drive shafts (axles) 30 that is connected to the differential gear 28. In the power transmission unit 16, power output from the engine 12 (which is the same meaning as a torque or a force when they are not particularly distinguished) is transmitted to the driving wheels 14 sequentially via the torque converter 20, the automatic transmission 22, the reduction gear mechanism 26, the differential gear 28, the drive shaft 30, and the like.

The engine 12 is a driving force source of the vehicle 10 and is a known internal combustion engine such as a gasoline engine or a diesel engine. An engine torque Te of the engine 12 is controlled by an electronic control unit 70 which is described later to control an operation state such as an amount of intake air, an amount of fuel supplied, and an ignition timing.

Figure 2:
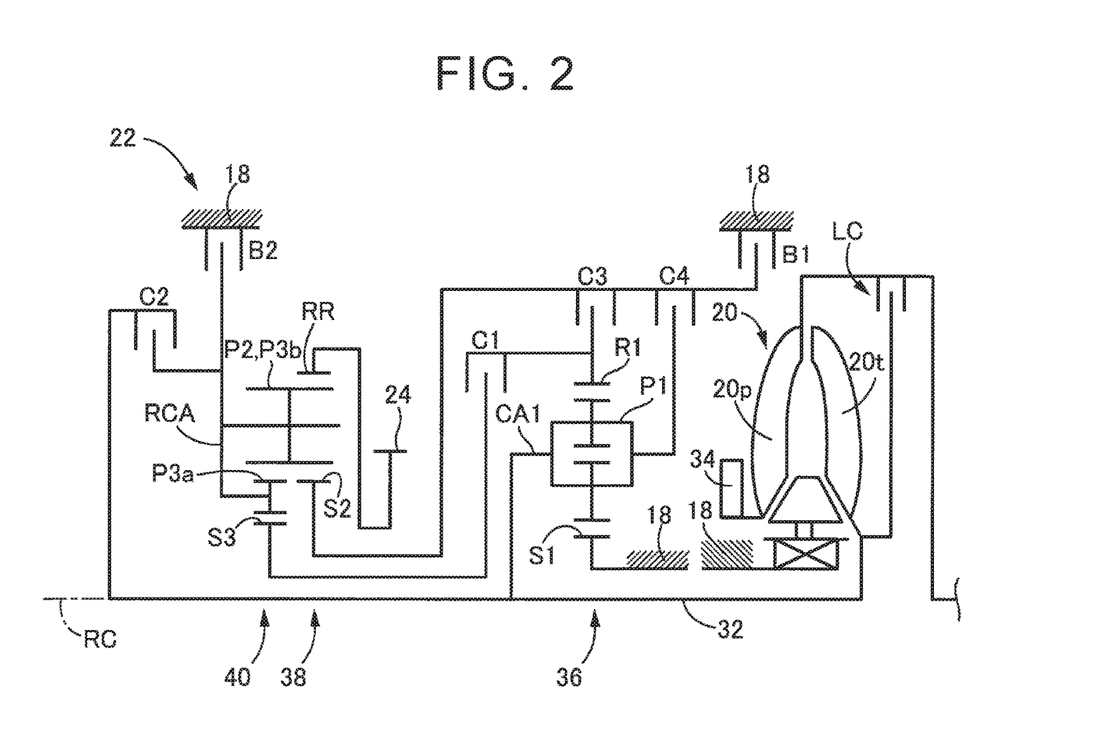
FIG. 2 is a skeleton diagram illustrating an example of a torque converter and an automatic transmission.

FIG. 2 is a skeleton diagram illustrating an example of the torque converter 20 and the automatic transmission 22. The torque converter 20, the automatic transmission 22, and the like are configured to be substantially symmetric about a rotation center RC of a transmission input shaft 32 which is an input rotary member of the automatic transmission 22, and a lower half below the rotation center RC is not illustrated in FIG. 2. The transmission input shaft 32 is an example of an input shaft.

In FIG. 2, the torque converter 20 is a hydraulic power transmission device which is disposed to be rotatable about the rotation center RC in the power transmission path between the engine 12 and the automatic transmission 22 and which includes a pump impeller 20p connected to the engine 12 and a turbine runner 20t connected to a transmission input shaft 32. The transmission input shaft 32 is also a turbine shaft that is rotationally driven by the turbine runner 20t. The power transmission unit 16 includes a lock-up clutch LC that can directly connect the pump impeller 20p to the turbine runner 20t (that is, input and output rotary members of the torque converter 20). The power transmission unit 16 includes a mechanical oil pump 34 that is connected to the pump impeller 20p. The oil pump 34 is rotationally driven by the engine 12 such that it ejects a hydraulic oil which is used for gear shift control of the automatic transmission 22 or which is used as a lubricant supplied to constituents parts of the power transmission path of the power transmission unit 16. That is, the hydraulic oil pumped by the oil pump 34 is supplied as a source hydraulic pressure of a hydraulic control circuit 50 (see FIG. 1) of the vehicle 10.

The automatic transmission 22 is a stepped type automatic transmission that constitutes a part of the power transmission path between the engine 12 and the driving wheels 14. The automatic transmission 22 is a planetary gear multistage transmission in which a double pinion-type first planetary gear mechanism 36 and a single pinion-type second planetary gear mechanism 38 and a double pinion-type third planetary gear mechanism 40, which constitute a Ravigneaux type, are disposed coaxially (on the rotation center RC). The automatic transmission 22 includes a plurality of engagement elements (hereinafter simply referred to as engagement elements C when they are not particularly distinguished) including a first clutch C1, a second clutch C2, a third clutch C3, a fourth clutch C4, a first brake B1, and a second brake B2.

The first planetary gear mechanism 36 includes a first sun gear S1, a plurality of pairs of first planetary gears P1 that engage with each other, a first carrier CA1 that supports the first planetary gears P1 such that they can rotate and revolve, and a first ring gear R1 that engages with the first sun gear S1 via the first planetary gears P1. The second planetary gear mechanism 38 includes a second sun gear S2, a second planetary gear P2, a carrier RCA that supports the second planetary gear P2 such that it can rotate and revolve, and a ring gear RR that engages with the second sun gear S2 via the second planetary gear P2. The third planetary gear mechanism 40 includes a third sun gear S3, a plurality of pairs of third planetary gears P3a and P3b that engage with each other, a carrier RCA that supports the third planetary gears P3a and P3b such that they can rotate and revolve, and a ring gear RR that engages with the third sun gear S3 via the third planetary gears P3a and P3b. The second planetary gear mechanism 38 and the third planetary gear mechanism 40 constitute a so-called Ravigneaux type in which the third planetary gear P3b is commonly used as the second planetary gear P2, the carrier is constituted by the common carrier RCA, and the ring gear is constituted by the common ring gear RR.

The engagement elements C are hydraulic frictional engagement elements which are constituted by wet type multi-disk clutches or brakes which are pressed by hydraulic actuators or band brakes which are tightened by hydraulic actuators. Operation states (states such as engagement or disengagement) of the engagement elements C are switched by changing torque capacities (clutch torques) Tc (that is, clutch torques Tc1, Tc2, Tc3, Tc4, Tb1, and Tb2) by hydraulic pressures (clutch pressures) Pc (that is, clutch pressures Pc1, Pc2, Pc3, Pc4, Pb1, Pb2) output from solenoid valves SL1 to SL6 in the hydraulic control circuit 50. In order to transmit a torque (for example, an input torque Ti input to the transmission input shaft 32, that is, a turbine torque Tt) between the transmission input shaft 32 and the transmission output gear 24 without causing the engagement elements C to slip (that is, without causing a differential rotation speed in the engagement elements C), torque capacities with which transmission torque equivalents which need to be assigned to the engagement elements C (that is, assigned torques of the engagement elements C) are acquired are required for the torques. Here, with the torque capacities in which the transmission torque equivalents are acquired, the transmission torque does not increase even when the torque capacities increase. In this embodiment, for the purpose of convenience, the clutch torque Tc and the clutch pressure Pc may be handled to have the same meaning.

In the automatic transmission 22, the first sun gear S1 is connected to the case 18. The first carrier CA1 is connected to the transmission input shaft 32. The first carrier CA1 and the second sun gear S2 are selectively connected to each other via the fourth clutch C4. The first ring gear R1 and the third sun gear S3 are selectively connected to each other via the first clutch C1. The first ring gear R1 and the second sun gear S2 are selectively connected to each other via the third clutch C3. The second sun gear S2 is selectively connected to the case 18 via the first brake B1. The carriers RCA is selectively connected to the transmission input shaft 32 via the second clutch C2. The carrier RCA is selectively connected to the case 18 via the second brake B2. The ring gear RR is connected to the transmission output gear 24.

The automatic transmission 22 is a stepped transmission in which a plurality of gear stages (shift stages) having different gear ratios (gear shift ratios) γ (=AT input rotation speed Ni/AT output rotation speed No) are selectively formed by causing an electronic control unit 70 to be described later to control engagement and disengagement of a predetermined engagement element among the engagement elements C depending on a driver's operation of an accelerator, a vehicle speed V, or the like (that is, to control engagement of an engagement-side element and disengagement of a disengagement-side element). For example, as illustrated in the engagement operation table of FIG. 3, in the automatic transmission 22, eight forward gear stages including a first gear stage "1st" to an eighth gear stage "8th" and a reverse gear stage "Rev" are selectively established. The AT input rotation speed Ni is a rotation speed of the transmission input shaft 32 (that is, an input rotation speed of the automatic transmission 22), and the AT output rotation speed No is a rotation speed of the transmission output gear 24 (that is, an output rotation speed of the automatic transmission 22). The gear ratio γ of the automatic transmission 22 corresponding to each gear stage is appropriately determined by gear ratios (=the number of teeth of the sun gear/the number of teeth of the ring gear) ρ1, ρ2, and ρ3 of the first planetary gear mechanism 36, the second planetary gear mechanism 38, and the third planetary gear mechanism 40. The gear ratio γ of the first gear stage "1st" is the largest, and the gear ratio becomes smaller as the vehicle speed becomes higher (toward the eighth gear stage "8th" side)

Figure 3:
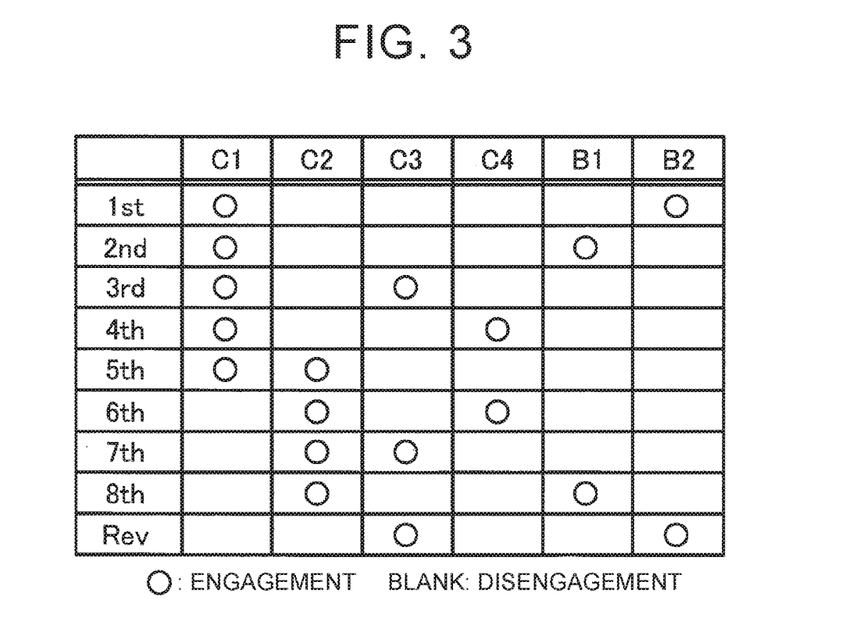
FIG. 3 is an operation diagram illustrating a relationship between a gear shift operation of an automatic transmission and a combination of operations of engagement elements used therein.

The engagement operation table illustrated in FIG. 3 shows a relationship between the gear stages established in the automatic transmission 22 and the operation state of each engagement element C, where "o" denotes engagement and blank denotes disengagement. As illustrated in FIG. 3, in the forward gear stages, the first gear stage "1st" is set by engagement of the first clutch C1 and the second brake B2. The second gear stage "2nd" is set by engagement of the first clutch C1 and the first brake B1. The third gear stage "3rd" is set by engagement of the first clutch C1 and the third clutch C3. The fourth gear stage "4th" is set by engagement of the first clutch C1 and the fourth clutch C4. The fifth gear stage "5th" is set by engagement of the first clutch C1 and the second clutch C2. The sixth gear stage "6th" is set by engagement of the second clutch C2 and the fourth clutch C4. The seventh gear stage "7th" is set by engagement of the second clutch C2 and the third clutch C3. The eighth gear stage "8th" is set by engagement of the second clutch C2 and the first brake B1. The reverse gear stage "Rev" is set by engagement of the third clutch C3 and the second brake B2. By disengaging any of the engagement elements C, the automatic transmission 22 becomes a neutral state in which any gear stage is not set (that is, a neutral state in which power transmission is intercepted).

Referring to FIG. 1 again, the vehicle 10 includes, for example, an electronic control unit 70 for the vehicle 10 associated with gear shift control of the automatic transmission 22. Accordingly, FIG. 1 is a diagram illustrating an input/output system of the electronic control unit 70 and is a functional block diagram illustrating principal parts of a control function by the electronic control unit 70. The electronic control unit 70 is constituted, for example, by a so-called microcomputer including a CPU, a RAM, a ROM, and an input/output interface, and the CPU performs a variety of control of the vehicle 10 by performing signal processing in accordance with a program stored in advance in the ROM using a temporary storage function of the RAM. For example, the electronic control unit 70 is configured to perform output control of the engine 12, gear shift control of the automatic transmission 22, and the like and is divided into an engine output control ECU, a hydraulic control (gear shift control) ECU, and the like if necessary.

The electronic control unit 70 is supplied with various signals based on detection values from various sensors disposed in the vehicle 10. Various sensors are, for example, an engine rotation speed sensor 52, an input rotation speed sensor 54, an output rotation speed sensor 56, an accelerator depression sensor 58, a throttle valve opening sensor 60, a brake switch 62, a shift position sensor 64, an oil temperature sensor 66. Various signals are, for example, an engine rotation speed Ne, an AT input rotation speed Ni which is a rotation speed of a turbine shaft (that is, a turbine rotation speed Nt), an AT output rotation speed No corresponding to the vehicle speed V, an accelerator depression amount θacc which is an amount of depression on an accelerator pedal, a throttle valve opening level θth which is an opening level of an electronic throttle valve, brake-on Bon which is a signal indicating a brake operation state in which a brake operating member for operating a wheel brake is operated by a driver, operation positions of a shift lever (shift positions) POSsh such as "P," "R," "N," and "D," and an hydraulic oil temperature THoil which is a temperature of a hydraulic oil in the hydraulic control circuit 50. Various command signals are supplied from the electronic control unit 70 to the devices disposed in the vehicle 10. Various command signals are, for example, an engine control command signal Se and a hydraulic control command signal Sat. The devices are, for example, the engine 12 and the hydraulic control circuit 50. The hydraulic control command signal Sat is a command signal (a hydraulic pressure command value, an instructed pressure) for driving the solenoid valves SL1 to SL6 that adjusts the clutch pressures Pc supplied to the hydraulic actuators of the engagement elements C and is output to the hydraulic control circuit 50. That is, engagement and disengagement of the engagement elements are controlled based on the command signal (the hydraulic pressure command value, the instructed pressure) output from the electronic control unit 70.

The electronic control unit 70 includes an engine control unit 72 and a gear shift control unit 74 to perform a control function for a variety of control in the vehicle 10.

The engine control unit 72 calculates a required driving force Fdem, for example, by applying the accelerator depression amount θacc and the vehicle speed V (which is the same meaning as the AT output rotation speed No) to a relationship (for example, a driving force map) which is calculated and stored in advance by experiment or design (that is, which is predetermined). The engine control unit 72 sets a target engine torque Tetgt at which the required driving force Fdem is acquired in consideration of a transmission loss, an auxiliary machine load, the gear ratio γ of the automatic transmission 22, and the like, and outputs the engine control command signal Se for performing output control of the engine 12 to a throttle actuator, a fuel injector, an igniter, and the like to achieve the target engine torque Tetgt.

The gear shift control unit 74 determines a gear shift of the automatic transmission 22, for example, by determining whether switching control of the gear stages of the automatic transmission 22 should be performed using a predetermined relationship (a gear shift map, a gear shift diagram). The gear shift control unit 74 determines a gear shift of the automatic transmission 22 (that is, determines a gear stage which is formed in the automatic transmission 22) by applying a vehicle speed-related value and a required degree of driving to the gear shift map. The gear shift control unit 74 outputs a gear shift command for engaging and/or disengaging the engagement elements C associated with the gear shift of the automatic transmission 22 as the hydraulic control command signal Sat to the hydraulic control circuit 50 to form the determined gear stage.

The gear shift map is a predetermined relationship having gear shift lines for determining a gear shift of the automatic transmission 22 in a two-dimensional coordinate system with the vehicle speed-related value and the required degree of driving as parameters. The gear shift lines in the gear shift map include upshift lines which are used to determine an upshift and downshift lines which are used to determine a downshift. The upshift lines and the downshift lines are determined in advance between the gear stages adjacent to each other among the plurality of gear stages. Each gear shift line is used to determine whether an actual vehicle speed-related value in a line indicating a certain required degree of driving crosses the line or whether an actual required degree of driving in a line indicating a certain vehicle speed-related value crosses the line, that is, whether the actual required degree of driving crosses a value (a gear shift point) at which the gear shift of the gear shift line has to be performed, and is predetermined as a link of the gear shift lines. The vehicle speed-related value is a vehicle speed V or a value related to the vehicle speed V and examples thereof include the vehicle speed V, a vehicle wheel speed, or the AT output rotation speed No. The required degree of driving is a value indicating a magnitude of a drive request for the vehicle 10 by a driver and examples thereof include the required driving force Fdem [N], a required driving torque [Nm] related to the required driving force Fdem, and a required driving power [W]. Simply, the accelerator depression amount θacc, the throttle valve opening level θth [%], or an amount of intake air [g/sec] may be used as the required degree of driving.

The gear shift control unit 74 performs a so-called clutch-to-clutch gear shift of reengaging the engagement elements associated with the gear shift of the automatic transmission 22 which are predetermined engagement elements among the engagement elements C (that is, switching engagement and disengagement of predetermined engagement elements) at the time of the gear shift of the automatic transmission 22. For example, in a 2→1 downshift from the second gear stage "2nd" to the first gear stage "1st," the first brake B1 and the second brake B2 are reengaged (that is, a clutch-to-clutch gear shift of disengaging the first brake B1 and engaging the second brake B2 is performed). In this embodiment, among the engagement elements C which are reengaged at the time of a gear shift, the engagement element to be disengaged is referred to as a disengagement-side element and the engagement element to be engaged is referred to as an engagement-side element. The hydraulic control command signal Sat includes an instructed pressure of the disengagement-side element (also referred to as a disengagement-side instructed pressure) for acquiring a clutch torque of the disengagement-side element at the time of a gear shift (also referred to as a disengagement-side clutch torque) and an instructed pressure of the engagement-side element (also referred to as an engagement-side instructed pressure) for acquiring a clutch torque of the engagement-side element at the time of a gear shift.

Control of a downshift of the automatic transmission 22 will be described below in detail. A downshift of the automatic transmission 22 can be roughly classified as a power-on downshift in which the downshift is determined (requested) by an increase in the required degree of driving (for example, due to the accelerator depression amount θacc) due to an increase in the accelerator depression amount or switching from turn-off of an accelerator to turn-on of the accelerator and a power-off downshift in which the downshift is determined (requested) by a decrease in the vehicle speed-related value (for example, the vehicle speed V) during deceleration due to a decrease in the required degree of driving (for example, the accelerator depression amount θacc) or due to turn-off of the accelerator. Particularly, the downshift which is requested in a state in which the vehicle is decelerating and traveling due to turn-off of the accelerator in the power-off downshift is a coast downshift. Among the downshift lines, a coast downshift line for determining a downshift when the accelerator depression amount θacc is zero (or zero and substantially zero) is set to a lower vehicle speed side than the downshift lines other than the coast downshift line. Accordingly, since a high gear stage is maintained up to a lower vehicle speed and the AT input rotation speed Ni is low, for example, a difference in synchronous rotation speed (=No×gear ratio γ) of the AT input rotation speed Ni between before and after the downshift decreases and a gear shift shock is suppressed. The power-on state is a driving state in which a torque based on the engine torque Te transmitted from the automatic transmission 22 to the driving wheels 14 is greater than a torque based on a load transmitted from the automatic transmission 22 to the engine 12. On the other hand, the power-off state is a driven state in which the torque based on the engine torque Te transmitted from the automatic transmission 22 to the driving wheels 14 is less than the torque based on a load transmitted from the automatic transmission 22 to the engine 12.

In the power-on downshift, when the disengagement-side clutch torque decreases, the turbine rotation speed Nt (=AT input rotation speed Ni) increases to the engine rotation speed Ne. Accordingly, the turbine rotation speed Nt increases to the synchronous rotation speed after the downshift without generating an engagement-side clutch torque. For this reason, in the power-on downshift, it is preferable that the downshift be performed with a focus on control of the disengagement-side clutch torque. On the other hand, in the power-off downshift, when the clutch torque of the engagement-side element forming the gear stage after the downshift is not generated, the turbine rotation speed Nt cannot increase to the synchronous rotation speed after the downshift and it is thus preferable that the downshift be performed with a focus on control of the engagement-side clutch torque.

In the coast downshift, the engine rotation speed Ne is maintained at an idle rotation speed of the engine 12, for example, in the state in which the vehicle is decelerating due to turn-off of the accelerator. When the coast downshift is a coast downshift in which the turbine rotation speed Nt during the gear shift is equal to or less than the idle rotation speed of the engine 12, the turbine rotation speed Nt increases to the synchronous rotation speed after the downshift without generating the engagement-side clutch torque. Accordingly, in this coast downshift, similarly to the power-on downshift, it is preferable that the downshift be performed with a focus on control of the disengagement-side clutch torque. The idle rotation speed of the engine 12 is the engine rotation speed Ne, for example, in an idling state of the engine 12 which is a state in which the engine 12 is driven to output a power for driving an auxiliary device of the vehicle and to output a power required for an autonomous operation of the engine 12.

The gear shift control by the gear shift control unit 74 at the time of a coast downshift of the automatic transmission 22 at which the turbine rotation speed Nt during the gear shift is equal to or lower than the idle rotation speed of the engine 12 will be described below in detail. When a gear shift command at the time of the coast downshift is started, first, a disengagement-side instructed pressure for preparation for decreasing the clutch pressure of the disengagement-side element (also referred to as a disengagement-side clutch pressure) is output and an engagement-side instructed pressure for packing the engagement-side element (that is, for switching to a state in which a clutch piston reaches a stroke end and the engagement-side clutch torque is not generated) is output. Subsequently, in order to start an inertia phase, the disengagement-side instructed pressure for decreasing the disengagement-side clutch pressure is output. When the increase of the turbine rotation speed Nt starts, the inertia phase starts, and then the turbine rotation speed Nt reaches the synchronous rotation speed after the downshift, the disengagement-side instructed pressure for rapidly decreasing the disengagement-side clutch pressure to a minimum value (zero) is output, the engagement-side instructed pressure for rapidly increasing the hydraulic pressure of the engagement-side element (also referred to as an engagement-side clutch pressure) to a maximum value (a full engagement pressure) is output, and then a series of gear shift control ends.

In the coast downshift in which the turbine rotation speed Nt during the gear shift is equal to or lower than the idle rotation speed of the engine 12, overspeeding of the turbine (overspeeding of the transmission input shaft 32) may occur. Here, overspeeding of the turbine means a state in which the turbine rotation speed Nt (that is, the AT input rotation speed Ni which is the rotation speed of the transmission input shaft 32, as mentioned above) exceeds the synchronous rotation speed after the downshift. In a state in which the engagement-side element is fully engaged, the turbine rotation speed Nt is equal to the synchronous rotation speed after the downshift. Accordingly, when overspeeding of the turbine occurs, it is considered that the engagement-side instructed pressure for rapidly increasing the engagement-side clutch pressure is output. In this case, since overspeeding of the turbine is suppressed using the engagement-side element forming a gear stage after the downshift having a gear ratio γ greater than that before the downshift, for example, a shock when overspeeding of the turbine is suppressed is relatively great and the drivability is likely to degrade in a traveling state such as the state in which the vehicle is decelerating due to turn-off of the accelerator.

Therefore, when overspeeding of the turbine occurs during the coast downshift, the gear shift control unit 74 performs a pressure increasing process of the disengagement-side element for increasing the disengagement-side instructed pressure to increase the disengagement-side clutch pressure, thereby suppressing overspeeding of the turbine.

The pressure increasing process of the disengagement-side element is control of increasing the disengagement-side clutch pressure, which has decreased to start the inertia phase or to perform the gear shift, again. Accordingly, when the clutch piston of the disengagement-side element does not reach a stroke end (that is, packing is not completed) due to a decrease of the disengagement-side clutch pressure before overspeeding of the turbine occurs, the disengagement-side clutch torque is not immediately generated in spite of increasing the disengagement-side clutch pressure through the pressure increasing process of the disengagement-side element. Alternatively, when a response of an actual disengagement-side element to the disengagement-side instructed pressure is delayed, the increase of the actual disengagement-side clutch pressure is delayed at the time of the pressure increasing process of the disengagement-side element. When the clutch piston of the disengagement-side element does not reach a stroke end or a hydraulic response characteristic of the disengagement-side element is slow due to the response delay of the actual disengagement-side clutch pressure and when the disengagement-side instructed pressure further increases during the pressure increasing process of the disengagement-side element due to non-suppression of overspeeding of the turbine, the actual disengagement-side clutch pressure further increases after overspeeding of the turbine has been suppressed. Then, there is a likelihood that the turbine rotation speed Nt becomes lower than the synchronous rotation speed after the downshift (that is, decreases to the synchronous rotation speed before the downshift) and a change of the turbine rotation speed Nt will become irregular. In this way, when the hydraulic response characteristic of the disengagement-side element is slow, there is a likelihood that the disengagement-side instructed pressure during the pressure increasing process of the disengagement-side element will increase excessively.

In the coast downshift in which the turbine rotation speed Nt during the gear shift becomes equal to or lower than the idle rotation speed of the engine 12, when the disengagement-side clutch torque is small, the turbine rotation speed Nt is sluggish in the vicinity of the idle rotation speed which is lower than the idle rotation speed of the engine 12 after being picked up. In other words, the turbine rotation speed Nt is not picked up over the idle rotation speed. By using this phenomenon, whether the clutch piston of the disengagement-side element reaches a stroke end or whether a response of the actual disengagement-side clutch pressure is delayed can be estimated. That is, when the picked-up turbine rotation speed Nt is not decreased but is sluggish (that is, the turbine rotation speed is sluggish in the vicinity of the idle rotation speed which is a overspeeding upper limit), it means that since the hydraulic response characteristic of the disengagement-side element is slow, the disengagement-side clutch torque is small or the disengagement-side clutch torque is not generated.

The electronic control unit 70 further includes a control state determiner, that is, a control state determining unit 76, to appropriately perform the pressure increasing process of the disengagement-side element for suppressing overspeeding of the turbine as described above.

Specifically, the control state determining unit 76 determines whether overspeeding of the turbine occurs during a coast downshift of the automatic transmission 22 (particularly, during a coast downshift in which the turbine rotation speed Nt during a gear shift is equal to or lower than the idle rotation speed of the engine 12) in the state in which the vehicle is decelerating due to turn-off of the accelerator. The control state determining unit 76 determines whether overspeeding of the turbine occurs, for example, based on whether the turbine rotation speed Nt is higher than the synchronous rotation speed after the downshift (=No×gear ratio γ after the downshift) or based on whether the turbine rotation speed Nt is higher by a predetermined rotation speed or more than the synchronous rotation speed after the downshift. The predetermined rotation speed is, for example, a predetermined threshold value for determining that overspeeding of the turbine.

When it is determined that overspeeding of the turbine occurs during a coast downshift of the automatic transmission 22, the control state determining unit 76 determines whether the turbine rotation speed Nt has not changed but is sluggish. The control state determining unit 76 determines whether the turbine rotation speed Nt has not changed but is sluggish, for example, based on whether a state in which an absolute value (=|current value−previous value|) of a change in rotation speed of the current value of the turbine rotation speed Nt from the previous value is less than a predetermined change in rotation speed is continued for a predetermined time or more. The predetermined change in rotation speed and the predetermined time are, for example, predetermined threshold values for determining that the turbine rotation speed Nt is sluggish. When it is determined that the turbine rotation speed Nt has not changed but is sluggish, it means, for example, that it is determined that the clutch piston of the disengagement-side element does not reach a stroke end or that it is determined that a response of the actual disengagement-side clutch pressure is delayed, that is, that it is determined that the hydraulic response characteristic of the disengagement-side element is slow.

When the control state determining unit 76 determines that overspeeding of the turbine occurs during the coast downshift of the automatic transmission 22, the gear shift control unit 74 performs the pressure increasing process of the disengagement-side element of increasing the disengagement-side instructed pressure to decrease the turbine rotation speed Nt. For example, the gear shift control unit 74 performs the pressure increasing process of the disengagement-side element by increasing the current value of the disengagement-side instructed pressure by a predetermined pressure from the previous value whenever the control state determining unit 76 determines that overspeeding of the turbine occurs. The predetermined pressure is, for example, a predetermined increase in hydraulic pressure for suppressing overspeeding of the turbine, and a fixed value may be used, or a value which is greater when the turbine rotation speed Nt increases than when the turbine rotation speed Nt decreases may be used, or a value which is greater before it is determined that the turbine rotation speed Nt is sluggish than after it is determined that the turbine rotation speed Nt is sluggish may be used.

The gear shift control unit 74 performs the pressure increasing process of the disengagement-side element when the control state determining unit 76 determines that the turbine rotation speed Nt is not sluggish. When the disengagement-side instructed pressure increases to decrease the turbine rotation speed Nt (that is, when the pressure increasing process of the disengagement-side element is performed) and the control state determining unit 76 determines that the turbine rotation speed Nt is sluggish, the gear shift control unit 74 holds the pressure increasing process of the disengagement-side element to decrease an increase gradient of the disengagement-side instructed pressure or to maintain the disengagement-side instructed pressure at the current value. For example, when the increase gradient of the disengagement-side instructed pressure is decreased, the gear shift control unit 74 increases the current value of the disengagement-side instructed pressure by a hydraulic pressure smaller than the predetermined pressure from the previous value. Alternatively, for example, when the disengagement-side instructed pressure is maintained at the current value, the gear shift control unit 74 sets the current value of the disengagement-side instructed pressure to the same value as the previous value.

Figure 4:
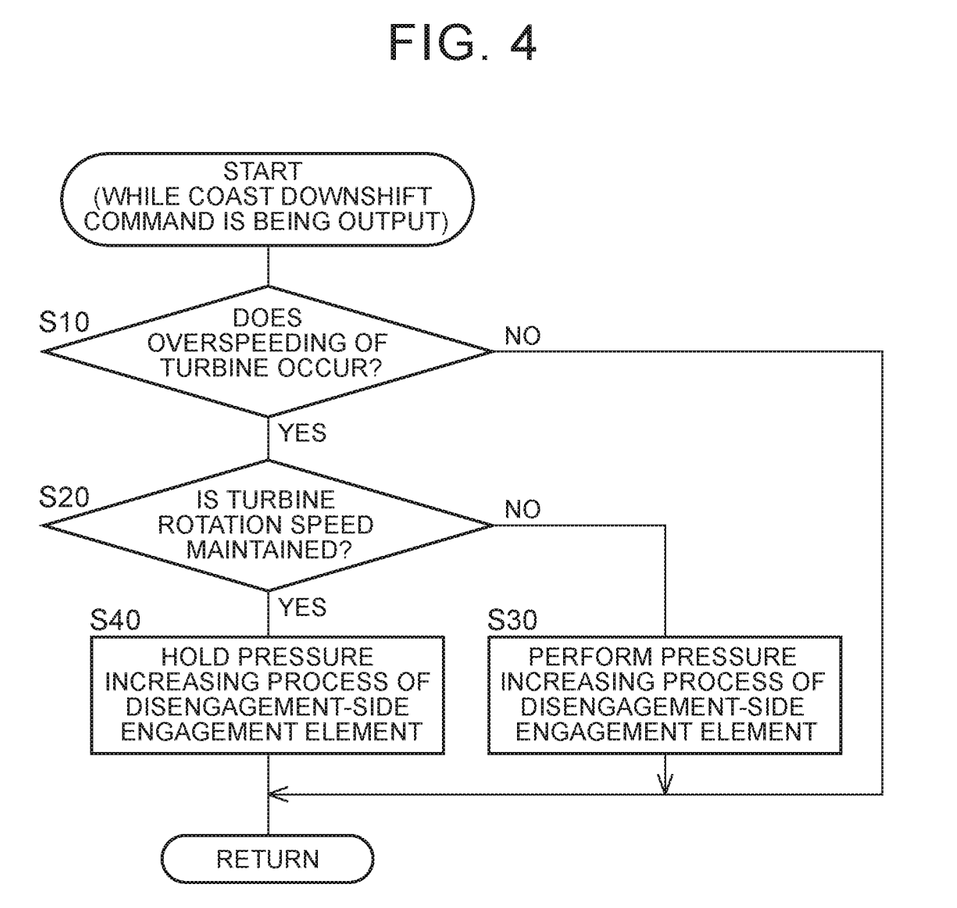
FIG. 4 is a flowchart illustrating a principal control operation of an electronic control unit, that is, a control operation for suppressing a degradation in drivability when overspeeding of a turbine (an input shaft) occurs during a coast downshift of the automatic transmission.
Figure 5:
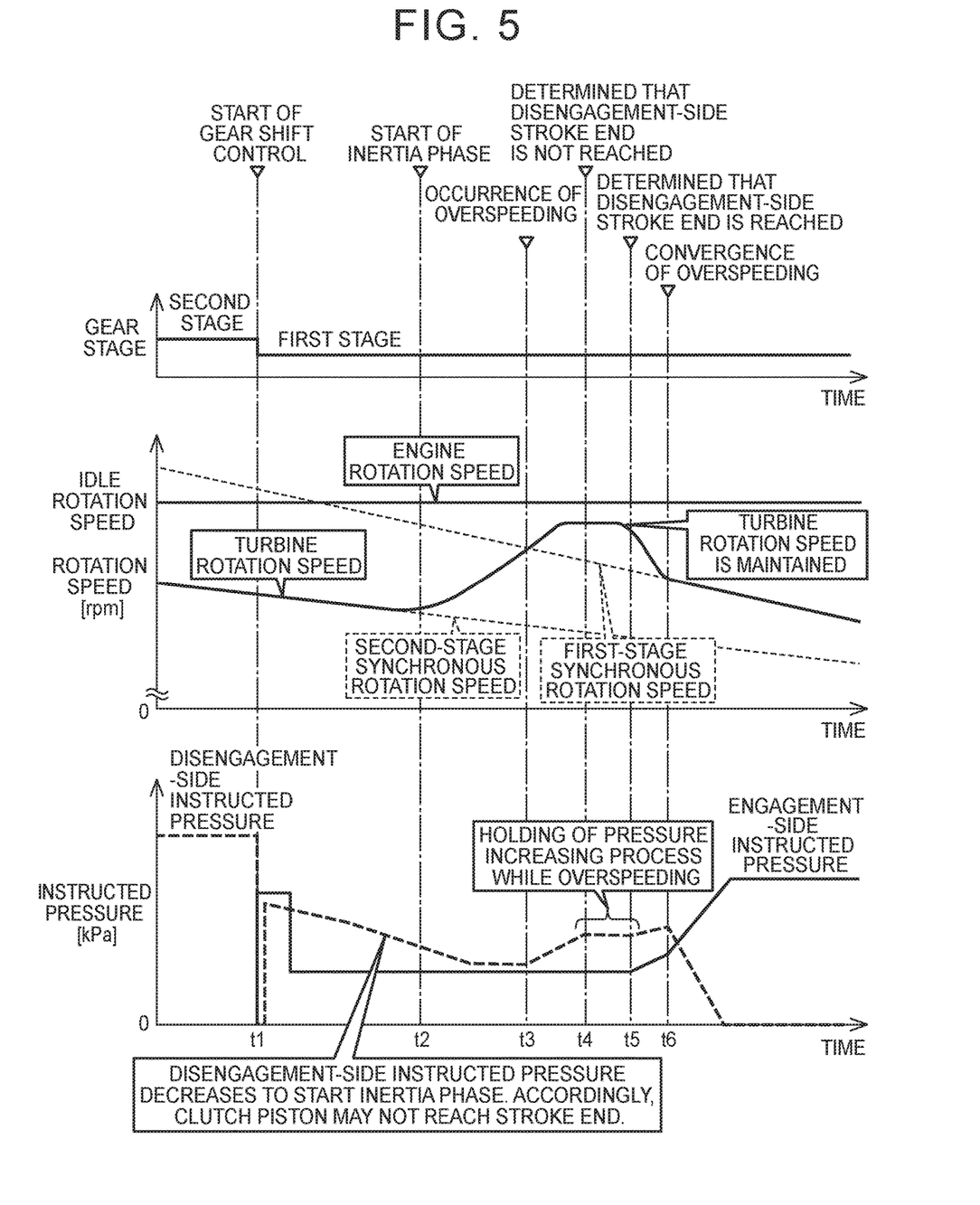
FIG. 5 is a diagram illustrating an example of a timing chart when the control operation illustrated in the flowchart of FIG. 4 is performed.

FIG. 4 is a flowchart illustrating a principal control operation of the electronic control unit 70, that is, a control operation for suppressing a degradation in drivability when overspeeding of the turbine occurs during a coast downshift of the automatic transmission 22 and this flowchart is repeatedly performed, for example, while a gear shift command for a coast downshift of the automatic transmission 22 is being output. FIG. 5 is a diagram illustrating an example of a timing chart when the control operation illustrated in the flowchart of FIG. 4 is performed.

In FIG. 4, first, in Step S10 (Step will be omitted hereinafter) corresponding to the function of the control state determining unit 76, it is determined whether overspeeding of the turbine occurs. When the determination result of S10 is negative, the current routine ends. When the determination result of S10 is positive, it is determined whether the turbine rotation speed Nt is sluggish in S20 corresponding to the function of the control state determining unit 76. When the determination result of S20 is negative, the pressure increasing process of the disengagement-side element is performed in S30 corresponding to the function of the gear shift control unit 74. On the other hand, when the determination result of S20 is positive, the pressure increasing process of the disengagement-side element is held in S40 corresponding to the function of the gear shift control unit 74. That is, at an initial time at which the determination result of S10 is positive, the determination result of S20 is negative and the pressure increasing process of the disengagement-side element is performed. Accordingly, when the determination result of S20 is positive, the pressure increasing process of the disengagement-side element is performed, and the pressure increasing process of the disengagement-side element is held in S40.

FIG. 5 illustrates an example of a 2→1 coast downshift in which the turbine rotation speed Nt during a gear shift becomes equal to or lower than the idle rotation speed of the engine 12. In FIG. 5, a disengagement-side instructed pressure and an engagement-side instructed pressure are output as a gear shift command for the 2→1 coast downshift. Time point t1 is an output start time point of the gear shift command (that is, a gear shift control start time point). With this gear shift command, the disengagement-side instructed pressure decreases to start the inertia phase. Accordingly, the clutch piston of the disengagement-side element may not reach a stroke end before overspeeding of the turbine. The inertia phase starts (see time point t2) and the downshift progresses. When overspeeding of the turbine occurs during the downshift (see time point t3), the pressure increasing process of the disengagement-side element starts and the disengagement-side instructed pressure increases (see time point t3 to time point t4). When it is determined that the turbine rotation speed Nt is sluggish during the pressure increasing process (for example, when it is determined that the clutch piston of the disengagement-side element does not reach a stroke end (see time point t4), the pressure increasing process is held and the disengagement-side instructed pressure is maintained at the current value (see time point t4 to time point t5). When it is determined that the turbine rotation speed Nt decreases during holding of the pressure increasing process (for example, when it is determined that the clutch piston of the disengagement-side element reaches a stroke end) (see time point t5), the pressure increasing process of the disengagement-side element is performed again to cope with overspeeding of the turbine (see time point t5 to time point t6). In this pressure increasing process, the increase gradient of the disengagement-side instructed pressure decreases in comparison with the pressure increasing process before the pressure increasing process is held. When overspeeding of the turbine converges and the turbine rotation speed Nt reaches a first-stage synchronous rotation speed, the pressure increasing process of the disengagement-side element ends (see time point t6). After the pressure increasing process ends, the disengagement-side instructed pressure decreases rapidly to a minimum value (zero) and the engagement-side instructed pressure increases rapidly to a maximum value (a full engagement pressure of the engagement-side element) (see time point t6 or time points subsequent thereto).

As described above, according to this embodiment, when overspeeding of the turbine (overspeeding of the input rotation shaft 32) occurs during a coast downshift of the automatic transmission 22, the disengagement-side instructed pressure increases to decrease the turbine rotation speed Nt. Accordingly, overspeeding of the turbine is suppressed by the disengagement-side element forming a gear stage before the downshift (that is, a high-side gear stage) having a gear ratio γ lower than after the downshift. As a result, when a change in driving force due to the decrease of the turbine rotation speed Nt decreases and a degradation in drivability can be suppressed when overspeeding of the turbine occurs during a coast downshift of the automatic transmission 22.

According to this embodiment, since the coast downshift of the automatic transmission 22 is a coast downshift in which the turbine rotation speed Nt during the gear shift is equal to or lower than the idle rotation speed of the engine 12, there is a likelihood that overspeeding of the turbine will occur during a downshift even in the state in which the vehicle is decelerating due to turn-off of the accelerator, but since the disengagement-side instructed pressure increases when overspeeding of the turbine occurs, overspeeding of the turbine is suppressed.

According to this embodiment, in the coast downshift in which the turbine rotation speed Nt is equal to or lower than the idle rotation speed of the engine 12, since overspeeding of the turbine is maintained equal to or lower than the idle rotation speed even when the disengagement-side clutch torque is small. Accordingly, since it can be estimated that the disengagement-side clutch torque does not increase (that is, that generation of the disengagement-side clutch torque is delayed with respect to the disengagement-side instructed pressure) by determining that the turbine rotation speed Nt is sluggish, it is possible to suppress an excessive increase of the disengagement-side instructed pressure when the responsiveness of the disengagement-side element degrades by decreasing the increase gradient of the disengagement-side instructed pressure or maintaining the disengagement-side instructed pressure at the current value when the turbine rotation speed Nt is sluggish. Accordingly, it is possible to prevent the turbine rotation speed Nt from becoming lower than the synchronous rotation speed after the downshift to change to the synchronous rotation speed before the downshift and to prevent the change of the turbine rotation speed Nt from becoming irregular.

While an embodiment of the disclosure has been described above in detail with reference to the drawings, the disclosure can be applied as other aspects.

For example, in the above-mentioned embodiment, the pressure increasing process of the disengagement-side element is held when the turbine rotation speed Nt is sluggish, but the disclosure is not limited to this aspect. For example, when overspeeding of the turbine occurs during a coast downshift of the automatic transmission 22, the pressure increasing process of the disengagement-side element may be performed regardless of whether the turbine rotation speed Nt is sluggish. In this case, S20 and S40 in the flowchart illustrated in FIG. 4 are skipped and S30 is performed when the determination result of S10 is positive. In this way, the flowchart illustrated in FIG. 4 can be appropriately modified. In this configuration, a predetermined advantage that the degradation in drivability can be suppressed is achieved by suppressing overspeeding of the turbine using the disengagement-side element. The coast downshift of the automatic transmission 22 is a downshift which is performed in the state in which the vehicle is decelerating due to turn-off of the accelerator, and may be a downshift which is performed in a brake-ON state in which an operation of operating a wheel brake is performed in the state in which the vehicle is decelerating due to turn-off of the accelerator. That is, the state in which the vehicle is decelerating due to turn-off of the accelerator includes the brake-ON state.

In the above-mentioned embodiment, the pressure increasing process of the disengagement-side element is performed to suppress overspeeding of the turbine, but the disclosure is not limited to this aspect. For example, overspeeding of the turbine may be suppressed by performing a pressure increasing process of an engagement-side element of increasing the engagement-side instructed pressure in addition to the pressure increasing process of the disengagement-side element. That is, the gear shift control unit 74 may increase the disengagement-side instructed pressure and increase the engagement-side instructed pressure such that the turbine rotation speed Nt decreases. In this case, the pressure increasing process of the disengagement-side element and the pressure increasing process of the engagement-side element are performed in S30 in the flowchart illustrated in FIG. 4, and the pressure increasing processes are held in S40. In this way, the flowchart illustrated in FIG. 4 can be appropriately modified. In this configuration, by increasing the disengagement-side instructed pressure and increasing the engagement-side instructed pressure such that the turbine rotation speed Nt decreases, the degree of decrease of the turbine rotation speed Nt by the engagement-side element is reduced in comparison with a case in which overspeeding of the turbine is suppressed using only the engagement-side element forming a low gear stage having a high gear ratio γ. Accordingly, it is possible to suppress degradation in drivability.

In the above-mentioned embodiment, the automatic transmission 22 includes gear stages of eight forward stages, but the disclosure is not limited to this aspect. The automatic transmission 22 has only to be a stepped transmission in which a plurality of gear stages having different gear ratios are selectively formed by controlling engagement and disengagement of predetermined engagement elements among a plurality of engagement elements. The stepped transmission may be a planetary gear automatic transmission such as the automatic transmission 22 or may be a synchromesh double-shaft automatic transmission which is an automatic transmission such as a dual clutch transmission (DCT) including two systems of input shafts.

In the above-mentioned embodiment, the engine 12 has been exemplified as a driving force source of the vehicle 10, but the disclosure is not limited to this aspect. For example, the driving force source may employ another motor such as an electric motor in combination with the engine 12. The power of the engine 12 is transmitted to the automatic transmission 22 via the torque converter 20, but the disclosure is not limited to this aspect. For example, a hydraulic power transmission device such as a fluid coupling not having a torque amplifying function may be used instead of the torque converter 20. Alternatively, the hydraulic power transmission device may not be provided.

The above-mentioned embodiment is only an example and the disclosure can be embodied in aspects including various modifications based on knowledge of those skilled in the art.

What is claimed is:

1. A control device for a vehicle,
the vehicle including an engine and a stepped transmission,
the stepped transmission including an input shaft and a plurality of engagement elements, the plurality of engagement elements including an engagement-side element and a disengagement-side element,
the stepped transmission being configured such that engagement of the engagement-side element and disengagement of the disengagement-side element are controlled such that a plurality of gear stages having different gear ratios is selectively established,
the control device comprising:
an electronic control unit configured to determine whether overspeeding of the input shaft occurs during a coast downshift of the stepped transmission, the overspeeding of the input shaft being a state in which a rotation speed of the input shaft is higher than a synchronous rotation speed after a downshift,
the electronic control unit being configured to control an engagement-side instructed pressure to be output for controlling a clutch torque of the engagement-side element, and to control a disengagement-side instructed pressure to be output for controlling a clutch torque of the disengagement-side element, and the electronic control unit being configured to increase the disengagement-side instructed pressure such that the rotation speed of the input shaft decreases, when the electronic control unit determines that the overspeeding of the input shaft occurs during the coast downshift of the stepped transmission.

2. The control device for a vehicle according to claim 1, wherein the electronic control unit is configured to perform upshift control and downshift control on the stepped transmission, and the coast downshift is a downshift in a state in which the vehicle decelerates and travels while an accelerator of the vehicle is not operated.

3. The control device for a vehicle according to claim 1, wherein the coast downshift of the stepped transmission is a coast downshift in which the rotation speed of the input shaft during gear shift becomes equal to or lower than an idle rotation speed of the engine.

4. The control device for a vehicle according to claim 3, wherein when the electronic control unit determines that the overspeeding of the input shaft occurs during the coast downshift of the stepped transmission, the electronic control unit is configured to determine whether the rotation speed of the input shaft has not changed and is sluggish, and when the disengagement-side instructed pressure increases to decrease the rotation speed of the input shaft and the electronic control unit determines that the rotation speed of the input shaft is sluggish, the electronic control unit is configured to perform one of reducing an increase gradient of the disengagement-side instructed pressure and retaining the disengagement-side instructed pressure at a current value.

5. The control device for a vehicle according to claim 1, wherein the electronic control unit is configured to increase the disengagement-side instructed pressure and to increase the engagement-side instructed pressure such that the rotation speed of the input shaft decreases.

6. A control method for a vehicle, the vehicle including an engine, a stepped transmission, and an electronic control unit, the stepped transmission including an input shaft and a plurality of engagement elements, the plurality of engagement elements including an engagement-side element and a disengagement-side element, the stepped transmission being configured such that engagement of the engagement-side element and disengagement of the disengagement-side element are controlled such that a plurality of gear stages having different gear ratios is selectively established, the control method comprising:

determining, by the electronic control unit, whether overspeeding of the input shaft occurs during a coast downshift of the stepped transmission, the overspeeding of the input shaft being a state in which a rotation speed of the input shaft is higher than a synchronous rotation speed after a downshift;

controlling, by the electronic control unit, an engagement-side instructed pressure to be output for controlling a clutch torque of the engagement-side element;

controlling, by the electronic control unit, a disengagement-side instructed pressure to be output for controlling a clutch torque of the disengagement-side element; and increasing, by the electronic control unit, the disengagement-side instructed pressure of the disengagement-side element such that the rotation speed of the input shaft decreases, when the electronic control unit determines that the overspeeding of the input shaft occurs during the coast downshift of the stepped transmission.

* * * * *